ABSTRACT

(12) United States Patent
L'Archeveque et al.

(10) Patent No.: US 9,471,706 B2
(45) Date of Patent: Oct. 18, 2016

(54) METHOD AND SYSTEM FOR REFINING A SEMANTIC SEARCH ON A MOBILE DEVICE

(75) Inventors: Benoit L'Archeveque, Lachenaie (CA); Mickael Camus, Montreal (CA); Denton Cockburn, Verdun (CA); Richard Pavy, Outremont (CA); Lise Rebout, Montreal (CA); Anthony Bryant, Terrasse-Vaudreuil (CA)

(73) Assignee: AZZIMOV INC., Montreal, Quebec (CA)

( * ) Notice: Subject to any disclaimer, the term of this patent is extended or adjusted under 35 U.S.C. 154(b) by 196 days.

(21) Appl. No.: 13/985,120

(22) PCT Filed: Mar. 7, 2012

(86) PCT No.: PCT/CA2012/000230
§ 371 (c)(1),
(2), (4) Date: Aug. 13, 2013

(87) PCT Pub. No.: WO2012/119246
PCT Pub. Date: Sep. 13, 2012

(65) Prior Publication Data
US 2013/0346398 A1  Dec. 26, 2013

(51) Int. Cl.
*G06F 17/30* (2006.01)
(52) U.S. Cl.
CPC ... *G06F 17/30941* (2013.01); *G06F 17/30731* (2013.01)
(58) Field of Classification Search
CPC .................. G06F 17/30554; G06F 17/30424; G06F 17/30598; G06F 17/30112
USPC ........................................... 707/722
See application file for complete search history.

(56) References Cited

U.S. PATENT DOCUMENTS

| | | | |
|---|---|---|---|
| 2007/0260635 A1* | 11/2007 | Ramer et al. | 707/104.1 |
| 2008/0133569 A1* | 6/2008 | Vu et al. | 707/102 |
| 2011/0055256 A1* | 3/2011 | Phillips et al. | 707/769 |
| 2012/0192112 A1* | 7/2012 | Garrison | G06F 3/0482 715/825 |
| 2012/0226681 A1* | 9/2012 | Paparizos | G06F 17/3053 707/723 |
| 2013/0054652 A1* | 2/2013 | Antonelli et al. | 707/797 |

* cited by examiner

*Primary Examiner* — Rehana Perveen
*Assistant Examiner* — Alexander Khong
(74) *Attorney, Agent, or Firm* — Brouillette and Partners; Robert Brouillette

(57) ABSTRACT

System and method are disclosed for refining a semantic search query through large quantities of dynamically created concept categories and their associated extracted values on a mobile device using only two filtering controls or buttons. The first filtering control is a Semantic Categorization Filter control and the second filtering control is a Semantic Categorization Selection control. The user queries a semantic search engine using text or voice controls. The results returned to the user imply the full scope of search results along with a dynamically created semantic categorization. The most relevant semantic categorization will be considered as the pre-selected category in the Semantic Categorization Filter control along with a list of possible dynamically created sub-categorizations and the Semantic Categorization Selection control will be pre-populated with other possible semantic categorizations of the result set.

16 Claims, 7 Drawing Sheets

METHOD AND SYSTEM FOR REFINING A SEMANTIC SEARCH ON A MOBILE DEVICE

CROSS-REFERENCE TO RELATED APPLICATIONS

The present patent application claims the benefits of priority of commonly assigned U.S. Provisional Patent Application No. 61/449,911, entitled "Method and System for Refining a Semantic Search of a Mobile Device" and filed at the United States Patent and Trademark Office on Mar. 7, 2011.

FIELD OF THE INVENTION

The present invention generally relates to systems and methods for refining semantic searches through large volumes of unstructured and/or semi-structured data.

BACKGROUND OF THE INVENTION

Various computer assisted search systems require that a set number of categories or category hierarchy be conceived based on the type of data that is being delivered to the end user. This methodology, however, brings two important limiting factors.

First, on a mobile device, the visual frame within which a user needs to make his selections is limited. A hierarchy of categories exceeding two levels generally becomes cumbersome and removes valuable screen real-estate from the result set.

Second, it does not take into account the search context of the user. A hierarchy imposed on the user might limit the ability of the user to find elements of interest to the user. For example, a user might be more interested in a particular colour of items as opposed to a range of prices. However, in a rigid hierarchy, the user might be forced to make multiple searches in each of the price ranges to find the list of products which pertain to a particular colour (traversing up and down the category hierarchy).

The following user/system dialog is representative of the conventional approach to result refinement following a text search:

User: Search term is "shoes";
System: Returns result list of all shoes and a list of pre-determined sub categories;
System: Gives as sub-categories: "Men's shoes, Women's shoes or Children's shoes"
User: Selects "Women's shoes"
System: Returns result list of all "Women's shoes";
System: Gives a list of sub categories to "Women's shoes" such as "blue, red, green" or "athletic, high-heel or dress shoe".

This example shows a linear approach to search refinement. It assumes that the first element that a user wishes to search is by a sub-category showing men's, women's or children's shoes and immediately following that selection the user is forced into another categorization (in this example "colour"). It is inflexible and does not allow the user to search as they wish. A user looking for all shoes that are blue in this case would have to traverse each major category first (men's, women's and finally children's) in order to see all blue shoes.

Though this approach could be tolerable on a desktop or laptop computer or when the number of products (or more generally items) is small, it is generally cumbersome on a mobile device due to the limited information that can be displayed due to the limited screen size.

These hierarchical approaches also tend to pre-define searchable categories. What this means in practical terms is that if someone typed a search term 'shoes' as in the previous example and wanted to refine their search to find 'blue leather shoes" but the material listing did not form part of the hierarchy defined in the search, the user would end up being limited to finding blue shoes in the men's, women's and children's categories. The users would then be left to themselves to determine if the shoes that they had found were indeed made of leather.

In view of the foregoing, there is a need for improved systems and methods for refining the results of semantic searches, particularly on mobile computing devices.

SUMMARY OF THE INVENTION

The aforesaid and other objectives are realized by generally providing system(s) and method(s) which allow a user to easily refine and navigate through the results of semantic searches using only two buttons or controls. Hereinafter, for the sake of clarity, the system and method will be referred to as the "two-button navigation interface".

The two-button navigation interface is based on a semantic organization of the words that can be searched. This semantic organization is generally stored on at least one semantic organization database that can be locally or remotely queried.

The two-button navigation interface is typically, though not necessarily, used or invoked in the context of a search done through a Web page or an application run and displayed on a mobile computing device ("mobile device") such as, but not limited to, a smart phone, a tablet, a pocket computer, etc.

The two buttons of the two-button navigation interface are typically, though not necessarily, soft buttons which are displayed on the display screen of the mobile device and which can be engaged tactilely via the display screen (which is a touchscreen). The two buttons can be positioned anywhere in the display screen of the mobile device as long as they are clearly visible and accessible to the user. The two buttons are also typically dynamic and reconfigurable as the search progresses.

The first and second buttons are dynamically populated by a Semantic Organizing Engine (SOE) upon receiving a search request. The SOE is, in turn, in communication with the semantic organisation database (also referred to as an ontology) which, as indicated above, contains all the words that can be searched for (e.g. item, product, label, color, gender, brand, style, type, material, size, price, quantity, etc.), and all the links between these words.

Upon receiving a search request, the Web page or the application will transmit a request to the semantic organisation database (SOD). The SOD will then return, to the SOE, every words, and every links between these words, that are related to the search request.

The SOE will then analyze the words and the links returned by the SOD and will structure them into an organized structure in which the words are organized into categories and sub-categories.

Based on internal and/or external data (e.g. relative weight of certain words/links, prior search data, etc.), the SOE will determine a main category among all the organized categories.

Based on the organized structure, the SOE will then populate the first button, also referred to as the Semantic Categorization Filter control, with the main category and its related sub-categories, and will populate the second button, also referred to as the Semantic Categorization Selection control, with the other categories.

Hence, after having submitted a search query, the first button will display the currently selected category, and the second button will display optional categorizations which are sensitive to the current search context. These buttons, in their collapsed state, generally take up very little display space which lends them to use on a mobile device.

In typically though non-limitative embodiments, when the user presses on the first button, the button will display a list of sub-categories, or child semantic categorizations, from which the user can choose. Selecting a sub-category will typically have three effects.

The first effect is that the scope of the search result set will be narrowed to only include results related to the selected sub-category.

The second is that the first button (Semantic Categorization Filter control) will be dynamically repopulated with a semantic category and its related sub-categories which are related to the original search term plus the selected semantic category (and any previously selected semantic categories).

Finally, the third effect is that the second button (the Semantic Categorization Selection control) will be populated with other possible semantic categorizations which are representative of a dynamic categorization of the current result set.

The user can continue filtering on semantic concepts using these two buttons or controls for as many semantic categorizations which are definable by the SOE based on the SOD.

Understandably, the categories are based on the semantic data present in the SOD which can be dynamic and updated regularly.

By having only two buttons, the two-button navigation interface provides enough navigation flexibility while using only a limited portion of the screen of the mobile device. Also, the two-button navigation interface allows the end user to quickly filter down search results by selecting those filtering attributes which are most relevant to the search context of the user.

Typically, the data which are searched and navigated through using the two-button navigation interface have been semantically organized beforehand in the SOD.

Other and further aspects and advantages of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which:

FIGS. 5A-7A and 5B-7B respectively illustrate the evolving two-button navigation interface of FIG. 1 and the evolving organized structure of FIG. 4.

DETAILED DESCRIPTION OF THE PREFERRED EMBODIMENT

Novel method and system for refining a semantic search on a mobile device will be described hereinafter. Although the invention is described in terms of specific illustrative embodiments, it is to be understood that the embodiments described herein are by way of example only and that the scope of the invention is not intended to be limited thereby.

In accordance with the present embodiment, a system and a method, collectively referred to as the "two-button navigation interface", provide a tool for refining semantic search query through large quantities of dynamically created concept categories and their associated extracted values using only two filtering controls or buttons. In the present embodiment, the two-button navigation interface is typically, though not necessarily, used or invoked in the context of a Web page or an application run and displayed on a mobile computing device ("mobile device") such as, but not limited to, a smart phone, a pocket computer or a mobile tablet.

As the name implies, the two-button navigation interface typically comprises only two buttons. As it will be best understood below, the first button is also referred to as a Semantic Categorization Filter control while the second button is also referred to as a Semantic Categorization Selection control.

Figures 1A, 1B, 1C:
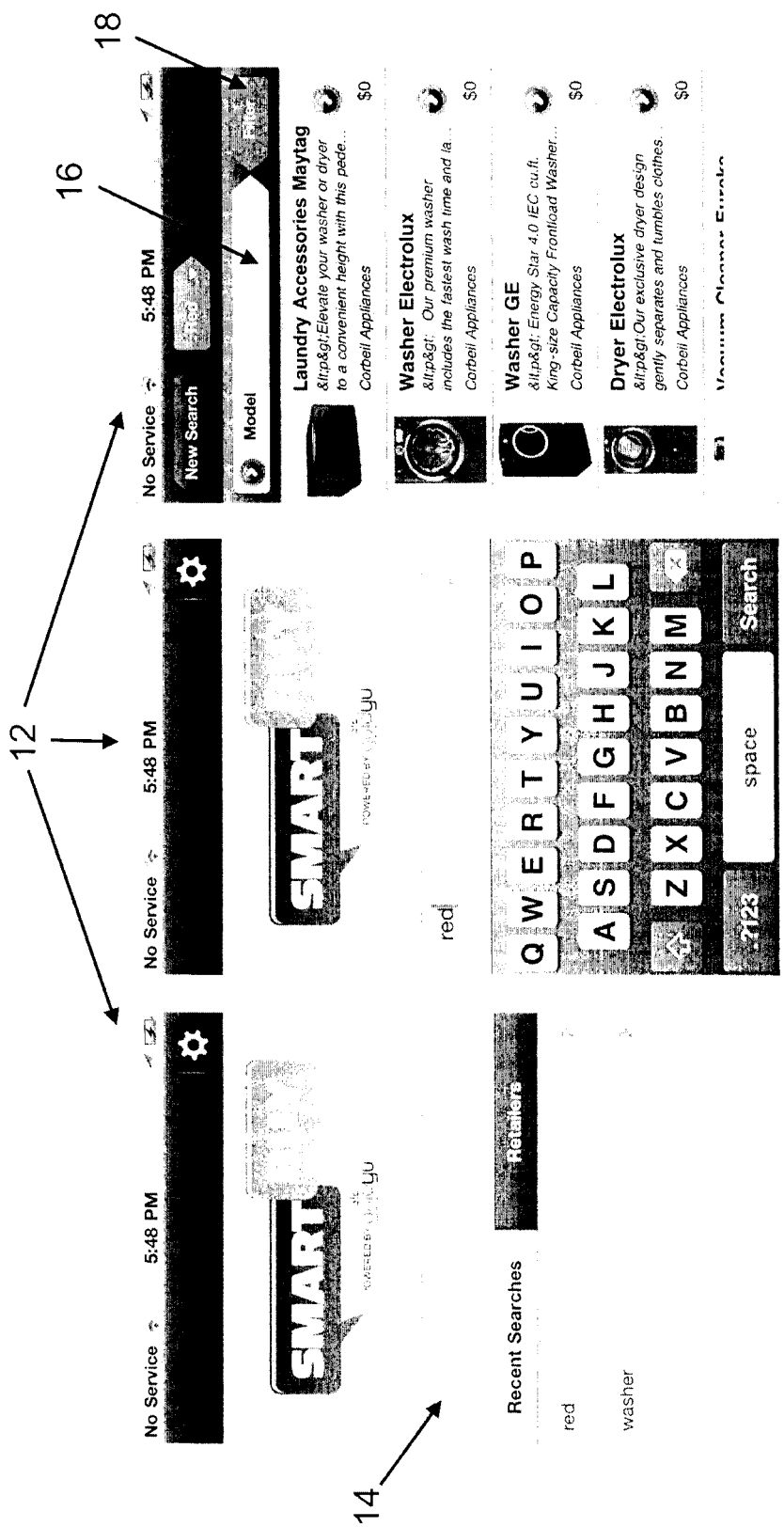
FIGS. 1A to 1C are screenshots of an embodiment of a two-button navigation interface in accordance with the principles of the present invention.

Referring first to FIGS. 1A to 1C, an example of an application run on a mobile device 10 and invoking the two-button navigation interface 12 is depicted. As shown in the figures, the interface comprises a search field 14, where the user can enter a search query, and, thereafter, the two buttons 16 and 18 of the two-button navigation interface. The search query typically comprises a plurality of words. Notably, in the present embodiment, the search field 14 and the two buttons 16 and 18 are not displayed on the same screen. However, in other embodiments, the search field 14 and the two buttons 16 and 18 could be displayed in the same screen. Also, in other embodiments, the search query could be entered vocally or using a third party application and thus, without the need for a search field 14.

In the present embodiment, the two buttons 16 and 18 are soft buttons which can be engaged via the touchscreen of the mobile device 10. In another embodiment, the soft buttons may be replaced by buttons located on the mobile device such as hardware buttons for controlling the mobile device.

Figure 2:
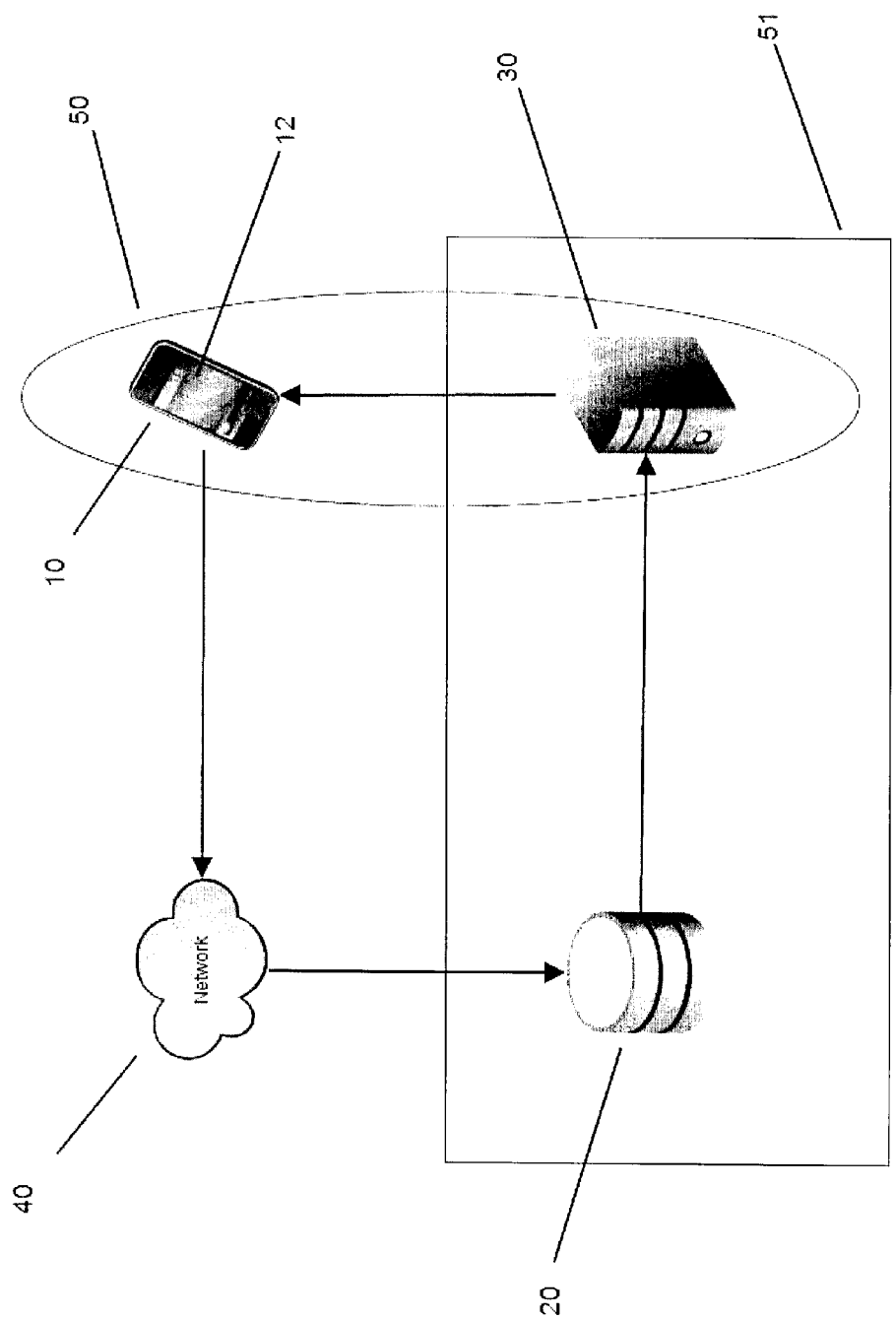
FIG. 2 is a schematic diagram illustrating an exemplary system configuration.

Referring now to FIG. 2, the two-button navigation interface 12, and thus the mobile device 10, is configured to interact with both at least one semantic organization database 20 ("SOD") and at least one semantic organizing engine 30 ("SOE").

In the present embodiment, the SOD 20 is typically located on one or more remote physical computer machines (not shown) accessible through a network or a combination of networks 40 such as, but not limited to, the Internet, a cellular communication network, a local area network, etc.

In another embodiment, the SOD 20 could be installed on the same physical server as the SOE 30 as shown by 51. Also, though the SOE 30 has been described as a remote entity, the SOE 30 may be installed on the mobile device having sufficient physical capabilities, such as computing processing power, storage or physical memory, to manipulate the words and links received by the SOD 20. An example of this configuration is exemplified by the elliptic element 50 shown on FIG. 2.

Figure 3:
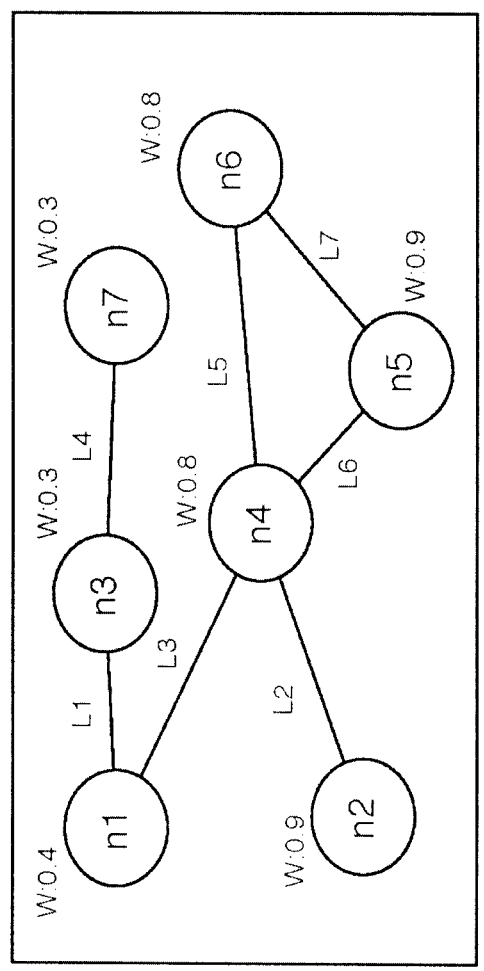
FIG. 3 is a schematic diagram illustrating an exemplary semantic organization.

Referring to FIG. 3, the SOD 20 contains a semantic organization 22 which includes all the words and all the links between those words that can be search via the two-button navigation interface 12 and that are semantically organized. The words can represent any attribute such as, but not limited to, a name (of an item or product), a label, a color, a gender, a brand, a style, a type, a material, a size, a price, a price range, a quantity, a number, a qualifier, etc. For their part, the links between two words represent the relation therebetween. Each relation is typically rated or weighted based on one or many parameters such as popularity, meaning or semantic value.

For instance, if one word is "shoe" and the other word is "black", then the link from "shoe" to "black" could be "color" and the link from "black" to "shoe" could be "product".

As best shown in FIG. 3, the semantic organization 22 can typically be represented as a graph where the words are the nodes and the links are the arcs between the nodes. Understandably, a word can be the origin and the destination of several links.

Though the semantic organization 22 stored on the SOD 20 could be static, it is preferably dynamic in nature as words and/or links are dynamically added, rated, weighted, deleted and/or modified.

As it will be better understood below, the role of the SOE 30 is to organize and structure the subset of words and links returned by the SOD 20 upon receiving a search query entered by the user.

Returning to FIG. 2, as the user enters and submits a search query, the search query will be transmitted to the SOD 20 in order for the SOD 20 to determine if any of the words and/or links of the semantic organization 22 stored therein matches or are related to the search query. The SOD 20 will then output all the words and links which match and/or are related to the search query and will transmit them to the SOE 30.

In the present embodiment, in order to limit the number of words and links returned by the SOD 30 and also in order to improve the relevancy of the outputted words and links, the words and/or the links of the semantic organization 22 can be assigned weight which can then be used to determine if a word or a link is relevant enough to the search query to be returned.

Figure 4:
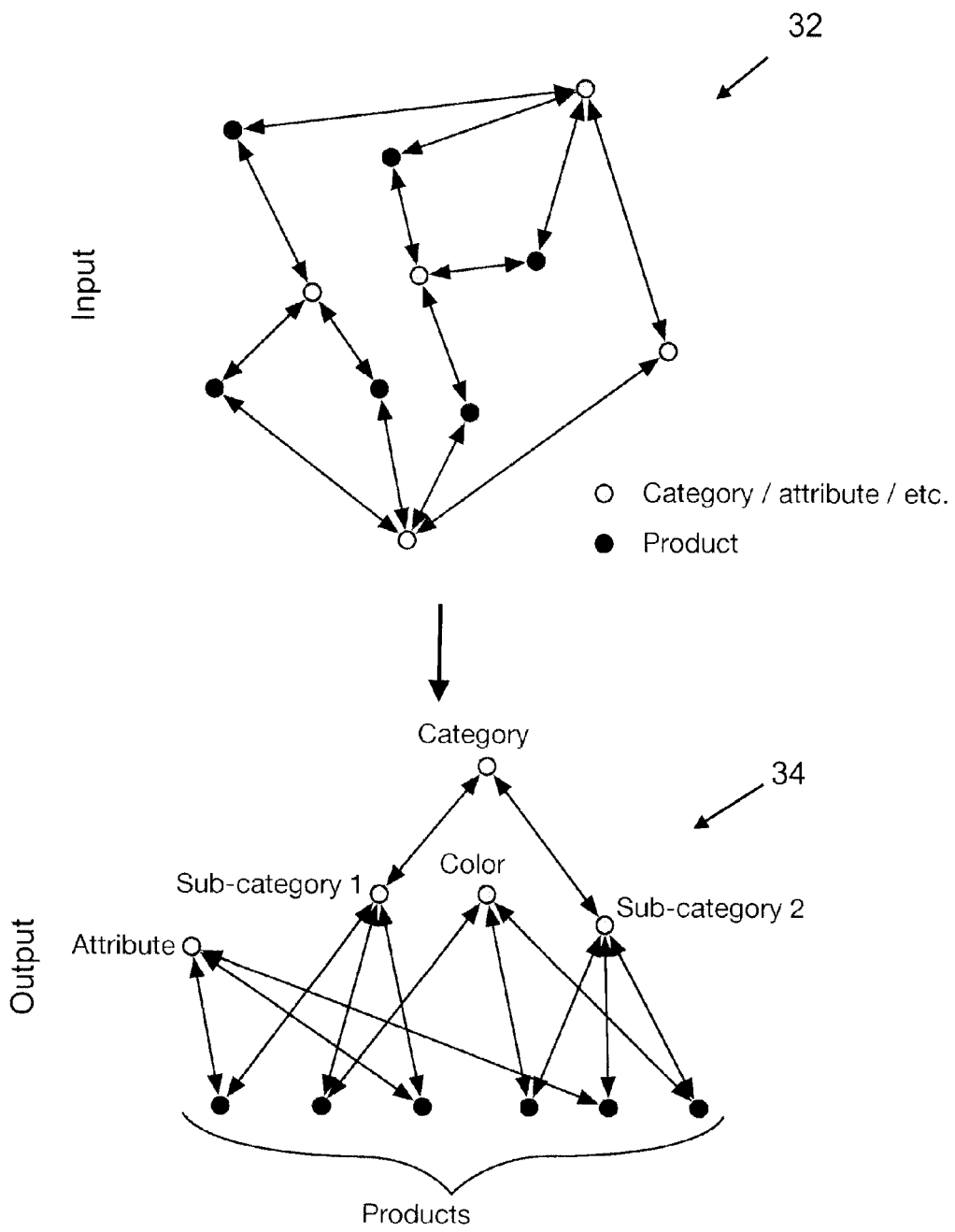
FIG. 4 is schematic diagram illustrating an exemplary semi-structure received by the SOE and an exemplary organized structure outputted by the SOE.

Referring now to FIG. 4, as indicated above, the SOE 30 will receive, as an input, all the words and links which are matching or are related to the search query entered by the user. However, at this point, the words and links are still in a semi or even unstructured form 32.

The SOE 30 will then reorganize and structure the words and links into a hierarchal structure 34 where categories and sub-categories have been determined based on the words and links, and possibly on their weight.

In the present embodiment, the SOE 30 will assign one of the categories as the main or most relevant category. This assignment can be determined based on internal data (e.g. data from previous similar searches, weights from the words/links, etc.) and/or on external data (e.g. data submitted by a third party).

The resulting structure 34 of categories and sub-categories will then be used to populate the first and second buttons 16 and 18 of the two-button navigation interface 12. The resulting structure 34 may comprise one or more main categories, one or more sub-categories and one ore more attributes related to the semi or unstructured form 32.

In the present embodiment, the SOE 30 will populate the first button 16, the Semantic Categorization Filter control, with the main category and its related sub-categories, and will populate the second button 18, Semantic Categorization Selection control, with the other categories, such as, but not limited to, other main categories and their related sub-categories, or attributes of a product or service.

Hence, after having submitted a search query, the user will have access to the two buttons 16 and 18 which will have been dynamically populated with categories and sub-categories semantically relevant to his search query.

At this point, if the user presses on the first button 16, i.e. the Semantic Categorization Filter control, the first button 16 will drop down, expand or present the one or more selections to the user using any type of widget, and display all the sub-categories associated with the category currently associated with the first button 16. The user will then be able to select one of the sub-categories for further narrowing his search.

If the user prefers to pursue his search with a different category than the one current associated with the first button 16, he only needs to press on the second button 18, i.e. Semantic Categorization Selection control. The second button 18 will then drop down, expand or present the one or more selections to the user using any type of widget, and display all the other categories as determined by the SOE 30.

If the user selects one of the other categories, the SOE 30 will, in effect, reorganize the structure 34 around the newly selected category but the size and content of the structure 34 will generally not change. Then the SOE 30 will populate the first button 16 with the newly selected category and its sub-categories. Still, the category formerly associated with the first button 16 will remain available through the second button 18.

However, when the user selects one of the sub-categories associated with the first button, the effects are different.

Firstly, the scope of the search result set will be narrowed to only include results related to the selected sub-category.

In that sense, the SOE 30 will reorganize the structure 34 around the selected sub-category. Understandably, the categories and/or sub-categories which are no longer related to the selected sub-category will be removed in order to take into account the selection(s) of the user. Consequently, the structure 34 will change and will typically become smaller or will be refined as some formerly possible search results would no longer be available due to the selection(s) of the user. The refined structure 34 will allow the user to narrow his search.

The SOE 30 will then dynamically populate the first button 16 with a new category and its sub-categories, and will populate the second button 18 with other categories.

Hence, as the user selects categories and sub-categories using only the two dynamically updated buttons 16 and 18, the SOE 30 dynamically reorganizes the structure 34 in response to the selection(s) of the user, and ultimately narrows the search results until the user finds what he is looking for. Understandably, if the user finds that the initial search query was not adequate, he can always submit a new search query and the process described above will occur anew, i.e. the two buttons 16 and 18 will be populated with new categories and sub-categories based on new words and linked outputted by the SOD 20 and organized by the SOE 30.

Referring now to FIGS. 5A to 7B, a dynamic example of navigation though search results using the two buttons 16 and 18 is illustrated. In the following example, figures identified as A will show the evolving two buttons 16 and 18 while figures identified as B will show the related evolving structure 34.

Figure 5A:
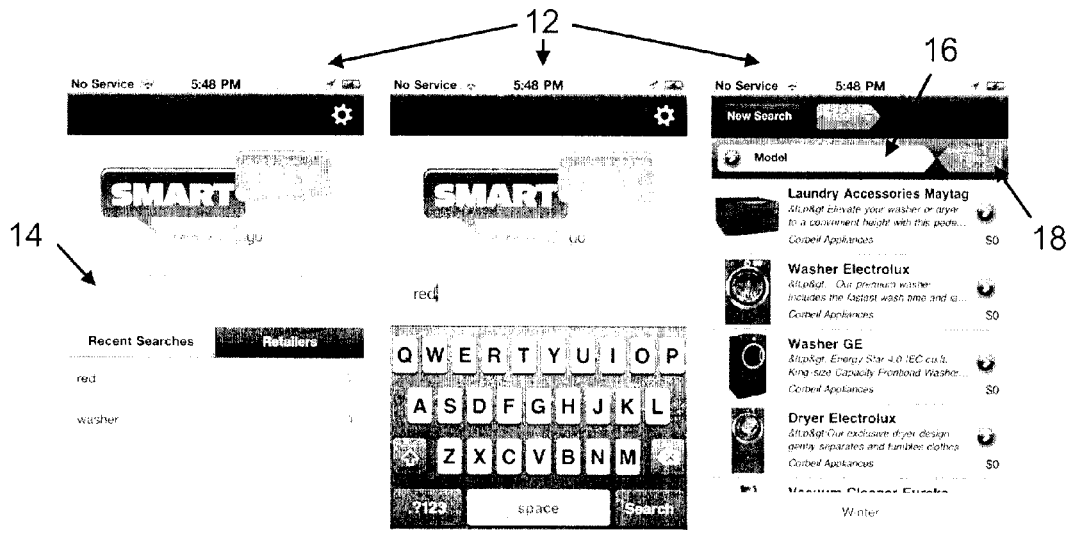
Figure 5B:
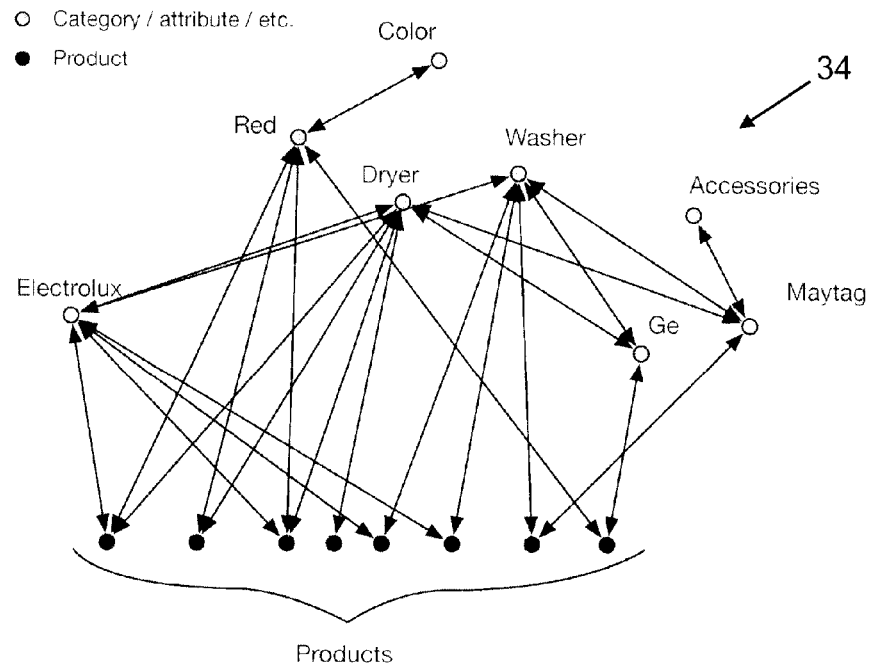

Referring first to FIGS. 5A and 5B, the user will typically be prompted with a search field 14 into which he can enter his search query. In the present example, the application which prompts the search field 14 is for searching appliances and, as shown in FIG. 5A, the user enters "red" as an initial search query.

As is now understood, the search query "red" will be transmitted to the SOD 20 in order for it to communicate back to the SOE 30 every words and every links which are related to the search query "red".

In the present example, the SOE 30 has reorganized the words and links forwarded by the SOD 20 into the organized structure 34 shown in FIG. 5B. Moreover, in the present example, the SOE 30 has determined that the main category is "Model" and has populated the first button 16 with "Model" and its related sub-categories which are particular brands of appliances. For its part, the second button 18 has been populated with the other categories.

Figure 6A:
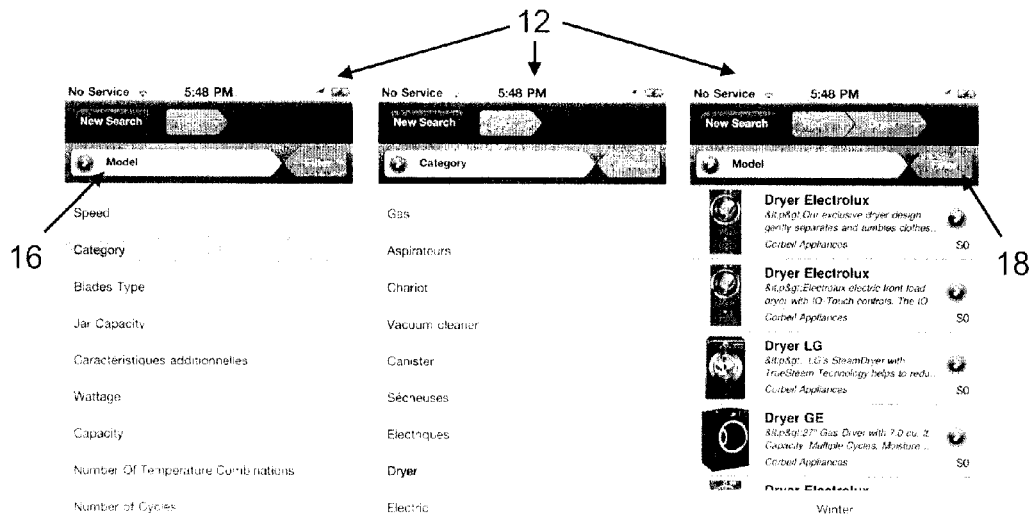
Figure 6B:
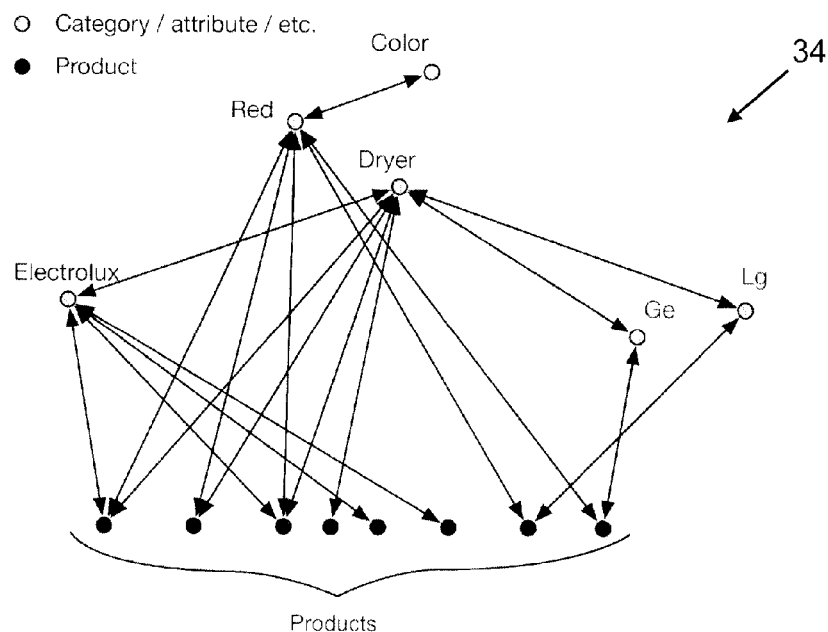

Referring now to FIGS. 6A and 6B, in the present example, the user is not satisfied with the "Model" category determined by the SOE 30. Instead, he is looking for dryers. Hence, the user presses on the second button 18 which displays other possible categories, one of which is the "Category" category which refers to the category of appliances. The user then selects the "Category" category. By selecting "Category" as the main category, the user has caused the SOE 30 to populate the first button 16 with "Category" and its related sub-categories which are particular types of appliances.

Then, the user selects "Dryer" as a sub-category.

Understandably, making such selections will cause the SOE 30 to reorganize the structure 34 around the selections of the user. In the present example, as the user has selected "Category" and then "Dryer", the SOE 30 will drop every categories, sub-categories, and products which are no longer related to the selections of the user.

Hence, as shown in FIG. 6B, some categories, sub-categories, and products have disappeared, such as "Washer", "Maytag" and "Accessories" as these categories, sub-categories have no related products, thereby narrowing the search results.

However, as shown in FIG. 6A, after "Dryer" has been selected as a sub-category, the first button 16 has been automatically populated with the category "Model". Indeed, as the SOE 30 reorganizes the structure 34, the most relevant category, taking into account the search query "red" and the selections "category" and "dryer" appears to be "Model". Hence, the SOE 30 has updated the first button 16 accordingly.

Figure 7A:
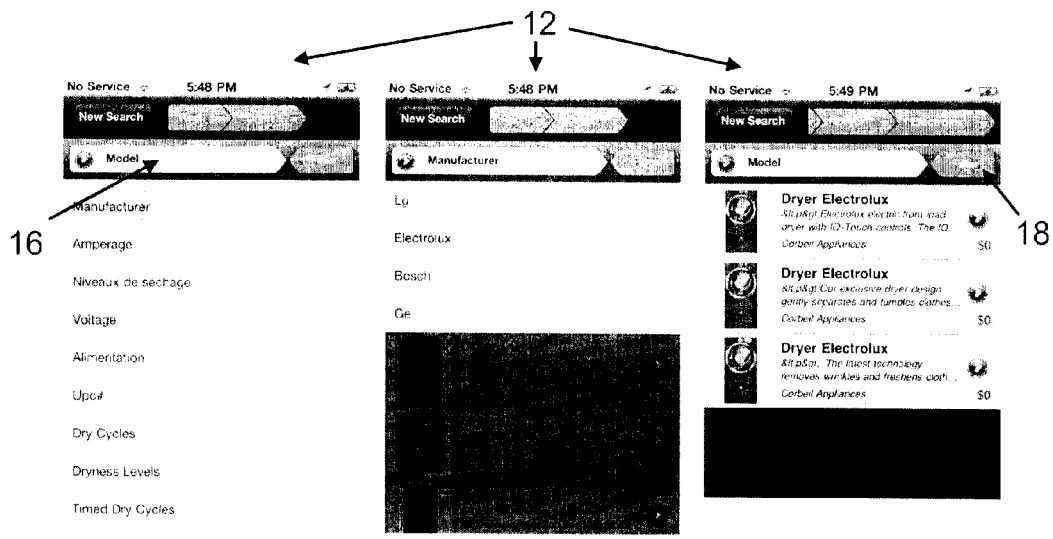
Figure 7B:
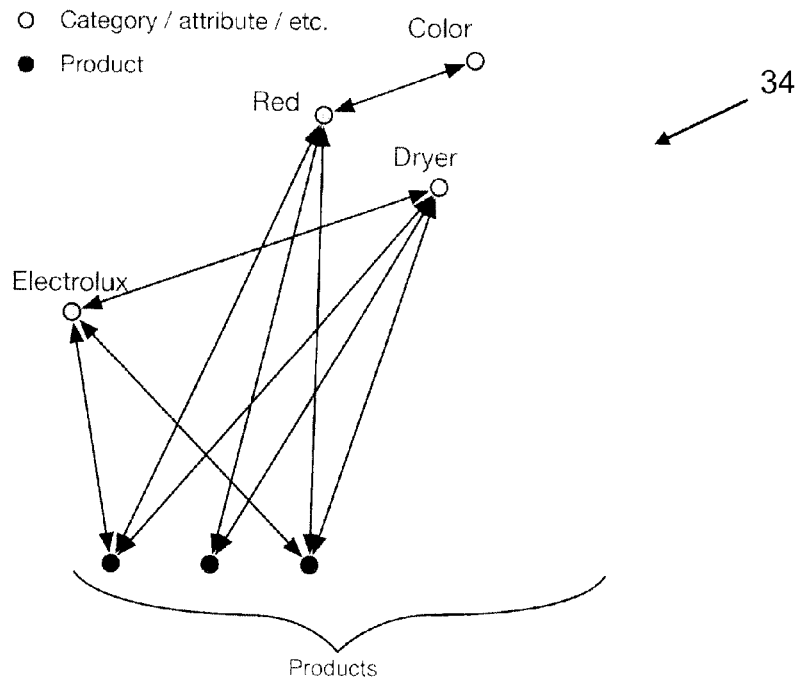

Referring now to FIGS. 7A and 7B, in the present example, the user does not want to continue the search with "Model". So the user presses on the second button 18 in order to have access to other categories. The user then selects "Manufacturer" as the new category. Doing so causes the SOE 30 to populate the first button with the category "Manufacturer" and its related sub-categories which are different manufacturers of dryers (and notably no longer simply of appliances). Then, as the user selects "Electrolux" as a sub-category, all the red Electrolux dryers are listed for review by the user.

Understandably, all the selections made by the user in FIG. 7A have caused the SOE 30 to again reorganize the structure 34 around the selections of the user. As can be seen in FIG. 7B, as the user selected "Manufacturer" and then "Electrolux", the SOE 30 has dropped every categories, sub-categories, and products which are no longer related to the selections of the user.

At this point, since there are only three red Electrolux dryers to review, the search results are much more manageable by the user. Also, and notably, the user has been able to reach these narrowed results using only the two buttons 16 and 18 which are dynamically updated by the SOE 30.

At this point, it is important to note that the pattern of selections made by the user can be used to update the semantic organization 22. For instance, the weight of the link between "red" and all the "red dryers" may be slightly increased in response to the aforementioned navigation.

Understandably, the more the semantic organization 22 is rich with words and links between the words, the more the navigation with the two buttons 16 and 18 will be rich and detailed.

The two-button navigation interface 12 in accordance with the principles of the present invention provides a simple way to navigate in hundreds or even thousands of results based on a semantic search.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A computerized device comprising a processor programmed to provide a navigating interface system for navigating through search results returned by a search query on unstructured or semi-structured data source, the search results being dynamically and semantically organized into categories and attributes in real-time, the interface system comprising, at most:
   a first user-engageable control dynamically populated with the categories and the attributes semantically related to the search results; and
   a second user-engageable control dynamically populated with filter values related to one of the categories or the attributes populated in the first user-engageable control;
   wherein a scope of the search results is responsive to a selection, by a user, of one of the attributes or categories which populate the first user-engageable control, and to a selection, by the user, of one of the filter values which populate the second user-engageable control.

2. The computerized device programmed to provide a navigating interface system as claimed in claim 1, wherein the first and second user-engageable controls are responsive to a selection, by the user, of one of the categories or attributes which populate the first user-engageable control, and to a selection, by the user, of one of the filter values which populate the second user-engageable control with respect to the selected one of the categories or attributes of the first user-engageable control.

3. The computerized device programmed to provide a navigating interface system as claimed in claim 1, wherein the first and second user-engageable controls are soft buttons displayed on a mobile computing device.

4. The computerized device programmed to provide a navigating interface system as claimed in claim 3, wherein the mobile computing device is a wireless mobile computing device.

5. A method to navigate through search results returned by a search query on unstructured or semi-structured data source, the search results being returned by a semantic organization upon receiving the search query and the search results being dynamically organized into categories and attributes in real-time, the method using an interface comprising at most a first user-engageable control dynamically populated with one of the categories and the attributes semantically related to the search query, and a second user-engageable control dynamically populated with filter values related to one of the categories or attributes, wherein a scope of the search results is responsive to a selection, by a user, of one of the categories or attributes which populate the first user-engageable control, and to a selection, by the user, of one of the filter values which populate the second user-engageable control, the method comprising:
- a) selecting one of the categories or attributes using the first user-engageable control;
- b) selecting one of the filter values using the second user-engageable control; and
- c) repeating a) and/or b), as necessary, to narrow the scope of the search results.

6. The method as claimed in claim 5, wherein the first and second user-engageable controls are responsive to a selection, by the user, of one of the categories or attributes which populate the first user-engageable control, and to a selection, by the user, of one of the filter values which populate the second user-engageable control.

7. The method as claimed in claim 5, wherein the first and second user-engageable controls are soft buttons displayed on a mobile computing device.

8. The method as claimed in claim 7, wherein the mobile computing device is a wireless mobile computing device.

9. The computerized device programmed to provide a navigating interface system as claimed in claim 1, the search results being dynamically and semantically organized into categories and attributes based on a search context, wherein the search context is semantically derived from the received search query.

10. The method as claimed in claim 5, wherein the method further comprises the search results being dynamically and semantically organized into categories and attributes based on a search context, the search context being semantically derived from the received search query.

11. The computerized device as claimed in claim 1, wherein the semantic organisation is configured to return words and links between the words related to the search query.

12. The computerized device as claimed in claim 11, wherein a semantic organizing engine is configured to analyze the returned words and links and structure the returned words and links into categories and sub-categories.

13. The computerized device as claimed in claim 12, wherein a semantic organizing engine is configured to determine the main category among all organized categories and sub-categories, the first user-engageable control being populated with main category and related sub-categories and the second user-engageable control with remaining categories.

14. The method as claimed in claim 5, wherein the method further comprises fetching words and links between the words related to the search query.

15. The method as claimed in claim 14, wherein the method further comprises:
- analyzing the returned words and links; and
- structuring the returned words and links into categories and sub-categories.

16. The method as claimed in claim 15, wherein the method further comprises:
- determining the main category among all organized categories and sub-categories;
- populating the first user-engageable control with main category and related sub-categories; and
- populating the second engageable control with other categories from organized categories and sub-categories.

* * * * *